(12) United States Patent
Chang

(10) Patent No.: US 7,438,437 B1
(45) Date of Patent: Oct. 21, 2008

(54) LED LAMP ASSEMBLY

(75) Inventor: Shao-Han Chang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/766,106

(22) Filed: Jun. 21, 2007

(30) Foreign Application Priority Data

Mar. 28, 2007 (CN) .......................... 2007 1 0200344

(51) Int. Cl.
*F21V 7/00* (2006.01)
(52) U.S. Cl. ...................... 362/248; 362/240; 362/247; 362/301; 362/302
(58) Field of Classification Search .................. 362/240, 362/247, 248, 249, 298, 300–303, 351
See application file for complete search history.

(56) References Cited

U.S. PATENT DOCUMENTS 6,491,412 B1 * 12/2002 Bowman et al. ............. 362/249
6,729,746 B2 * 5/2004 Suehiro et al. .............. 362/241
6,886,962 B2 * 5/2005 Suehiro ...................... 362/241
7,181,378 B2 * 2/2007 Benitez et al. ................. 703/2

\* cited by examiner

*Primary Examiner*—Thomas M Sember
(74) *Attorney, Agent, or Firm*—Frank R. Niranjan

(57) ABSTRACT

An exemplary LED lamp includes a housing, a printed circuit board, at least one LED, a light reflective module and a lamp cover. The printed circuit board is positioned on a bottom of the housing. The LED electrically connects with the printed circuit board. The light reflective module includes at least one light-shielding sheet and a bottom reflective plate disposed between the printed circuit board and the light-shielding sheet. The bottom reflective plate defines at least one through hole. The LED passes through the at least one through hole correspondingly. Each light-shielding sheet defines a plurality of light holes and covers the LED correspondingly. The lamp cover is fixed on the opening of the housing. The LED lamp has a uniformity brightness.

17 Claims, 11 Drawing Sheets

LED LAMP ASSEMBLY

FIELD OF THE INVENTION

The present invention relates to a lamp assembly, and more particularly to a light emitting diode lamp assemblies employed in a direct type backlight module of a liquid crystal display.

DISCUSSION OF THE RELATED ART

Typically, light emitting diodes (LEDs) are preferred over other types of light sources because LEDs exhibits low energy consumption, long service life, and other advantages. Therefore, LEDs are widely used as light sources.

Typically, FIG. 1 illustrates a LED lamp assembly 10 using LEDs as a light source. The LED lamp assembly 10 includes a housing 11, a printed circuit board 12, a plurality of side-lighting type LEDs 13, a light reflective module 14, a plurality of circular reflective layers 15 and a lamp cover 16. The housing 11 is an elongated, hollow structure having an opening 112. The LEDs 13 are arranged apart and electrically connected to the printed circuit board 12. The printed circuit board 12 with the LEDs 13 is disposed on the bottom surface of the housing 11. The light reflective module 14 includes a rectangular bottom reflective plate 144 and four connecting sidewalls 142 extending from a periphery of the bottom reflective plate 144. The bottom reflective plate 144 defines a plurality of through holes 146, configured for allowing the light-emitting portions of the LEDs 13 to pass through. The light reflective module 14 can be correspondingly mounted into the housing 11 via the opening 112. The circular reflective layers 15 are positioned at the top of each LED 13 respectively. The lamp cover 16 is fixed on the opening 112 of the housing 11. Light rays from the LEDs 13 are substantially reflected at the sidewalls 142, the bottom reflective plate 144, and finally output from the lamp cover 16. With the help of the light reflective module 14, an efficiency of utilization of light energy of the LED lamp 10 is increased.

Nevertheless, the brightness above the LEDs 13 of the LED lamp assembly 10 is decreased due to the light reflection off of the circular reflective layers 15, and a plurality of dark areas between two adjacent LEDs 13 still occur. Accordingly a uniform brightness of the LED lamp assembly 10 is low.

What is needed, therefore, is an LED lamp assembly which have a uniform brightness.

SUMMARY

An LED lamp assembly according to a preferred embodiment includes a housing, a printed circuit board, at least one LED, a light reflective module and a lamp cover. The housing has an opening. The printed circuit board is positioned on a bottom of the housing. The at least one LED is electrically connect with the printed circuit board. The light reflective module includes at least one light-shielding sheet and a bottom reflective plate disposed between the printed circuit board and the light-shielding sheet. The bottom reflective plate defines at least one through hole. The at least one LED passes through the at least one through hole correspondingly. The at least one light-shielding sheet defines a plurality of light holes and covers the at least one LED correspondingly. The light-shielding sheet and the bottom reflective plate cooperatively define a light-mixing space. The lamp cover is fixed on the opening of the housing.

Other advantages and novel features will become more apparent from the following detailed description of various embodiments, when taken in conjunction with the accompanying drawings.

BRIEF DESCRIPTION OF THE DRAWINGS

The components in the drawings are not necessarily drawn to scale, the emphasis instead being placed upon clearly illustrating the principles of the present LED lamp. Moreover, in the drawings, like reference numerals designate corresponding parts throughout the several views, and all the views are schematic.

DETAILED DESCRIPTION OF THE PREFERRED EMBODIMENTS

References will now be made to the drawings to describe preferred embodiments of the present LED lamp assembly, in detail.

Figure 1:
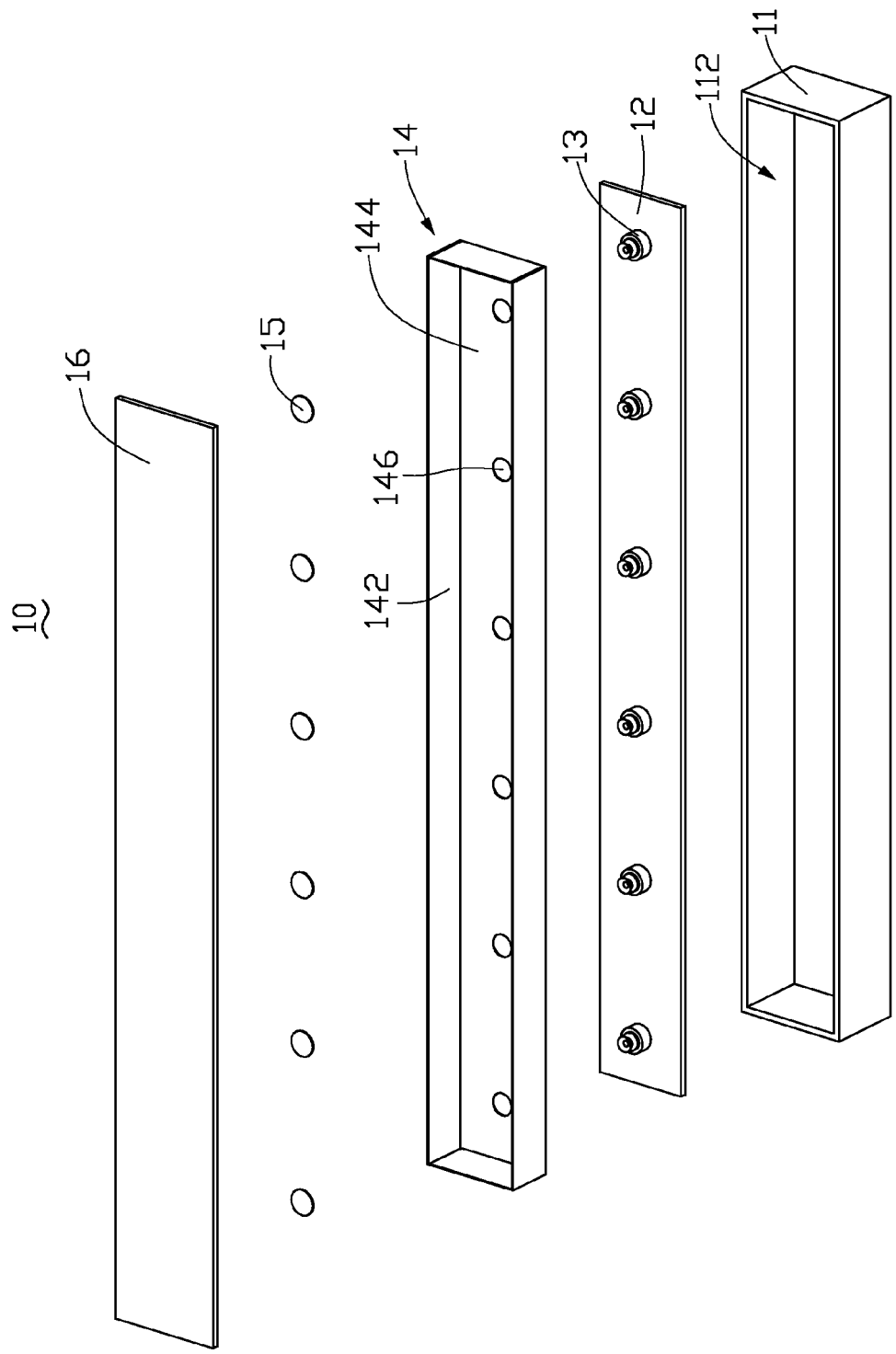
FIG. 1 is an exploded, isometric view of a conventional LED lamp assembly.
Figure 2:
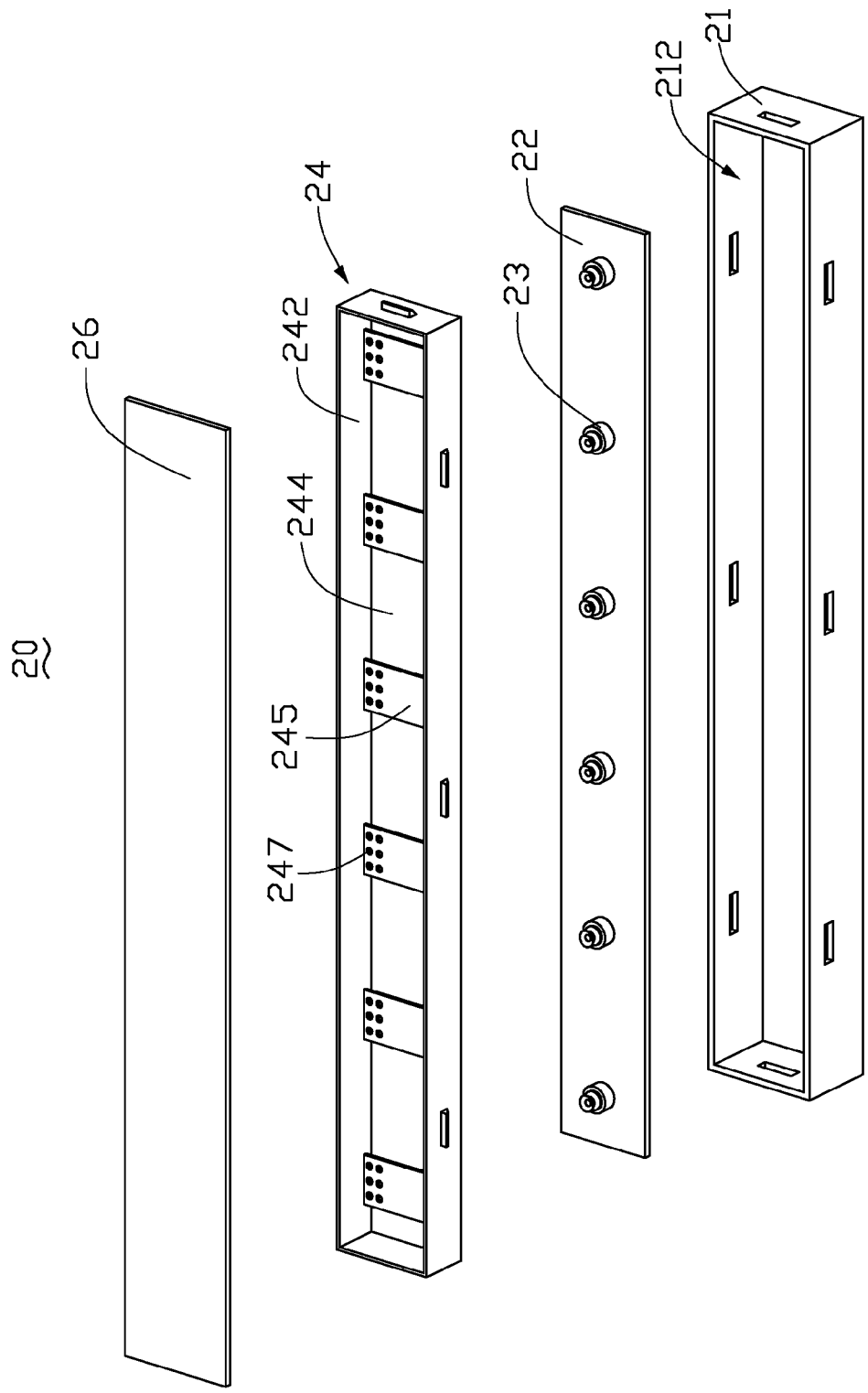
FIG. 2 is an exploded, isometric view of an LED lamp assembly according to a first preferred embodiment of the present invention.
Figure 3:
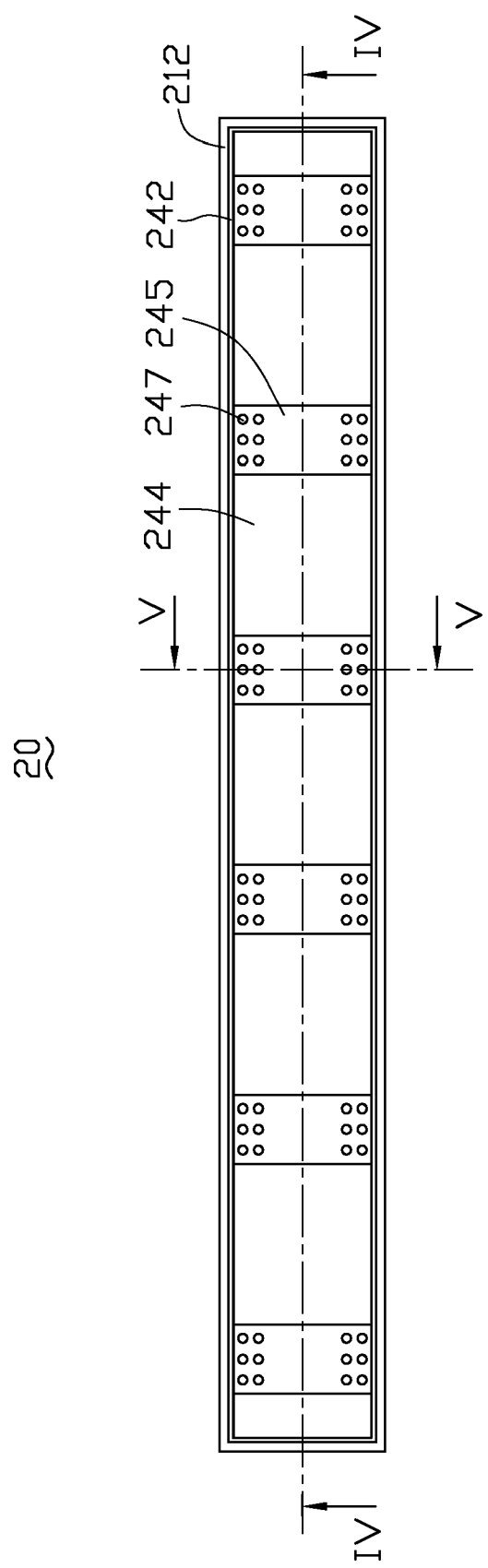
FIG. 3 is a top plan view of the LED lamp assembly without a lamp cover.
Figure 4:
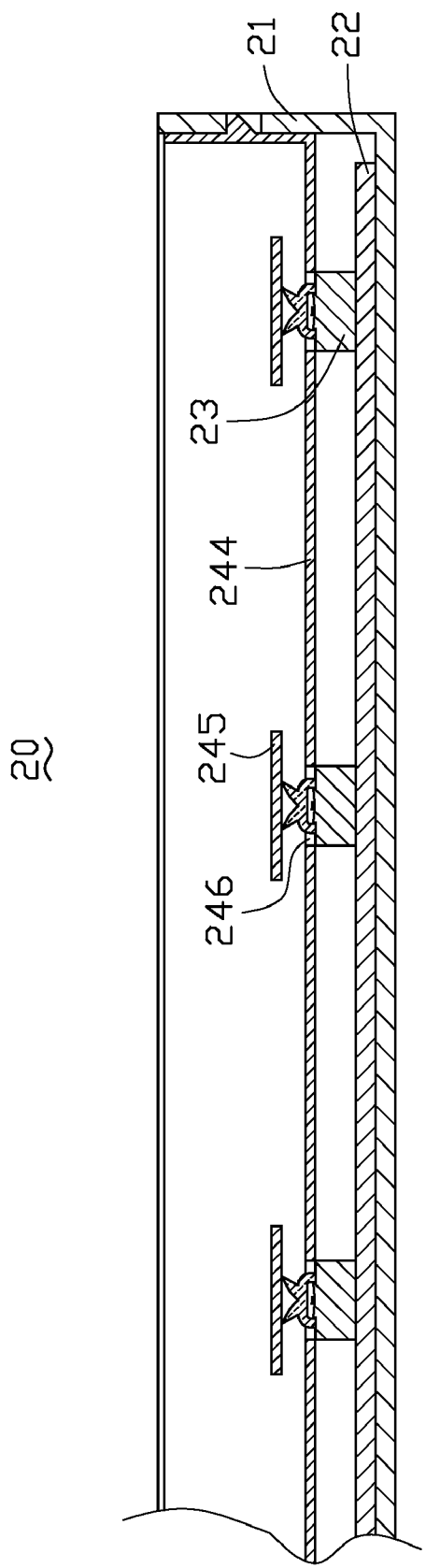
FIG. 4 is a side, enlarged, partly, cross-sectional view of the LED lamp assembly of FIG. 3, taken along line IV-IV thereof.

Referring to FIGS. 2 through 4, an LED lamp assembly 20 in accordance with a first preferred embodiment of the present invention is shown. The LED assembly 20 includes a housing 21, a printed circuit board 22, a plurality of side-emitting type LEDs 23, a light reflective module 24, and a lamp cover 26. The housing 21 is an elongated, hollow structure defining a receiving opening 212. The LEDs 23 are separately arranged and electrically connected to the printed circuit board 22. The printed circuit board 22 with the LEDs 23 is disposed in the receiving opening 212 on a bottom surface of the housing 21.

The light reflective module 24 can be mounted into the opening 212 of the housing 21. The light reflective module 24 includes a rectangular bottom reflective plate 244 and four connecting sidewalls 242 extending vertically from a periphery of the bottom reflective plate 244. Inner surfaces of the sidewalls 242 and bottom surface of the bottom reflective plate 244 are high reflective surfaces, and the sidewalls 242 and the bottom reflective plate 244 are made of a combination of metal materials and/or plastic materials. The bottom reflective plate 244 defines a plurality of through holes 246 corresponding to the LEDs 23 on the printed circuit board 22. The bottom reflective plate 244 is supported by base portion of each of the LEDs 23. Side light-emitting portions of the LEDs 23 pass through the through holes 246 correspondingly. The light reflective module 24 further includes a plurality of light-shielding sheets 245. Each LED 23 is covered by one of the light-shielding sheets 245 correspondingly. Each light-shielding sheet 245 extends at midsections from two opposing sidewalls. In the preferred embodiment, the opposing sidewalls receiving the two ends of the light-shielding sheet 245 are the two longest sidewalls of the four connecting sidewalls 242. A plurality of light holes 247 are defined at ends of each light-shielding sheet 245 adjacent to the two opposite sidewalls 242. The lamp cover 26 seals the opening 212 of the housing 21. The lamp cover 26 can be either a transparent plate or a light diffusion plate.

In this embodiment, the light holes 247 have same shapes and sizes, and are formed in a matrix manner close to the edges of the light-shielding sheet 245. A diameter of each of the through holes 246 is shorter than a nearest distance between adjacent light holes at two edges of the light-shielding sheet 245. In alternative embodiments, the bottom reflective plate 244 can be positioned on the printed circuit board 22 and the LEDs 23 substantially protrude through the through holes 246 entirely. In addition, the sidewalls 242 of the light reflective module 24 and sidewalls (not labeled) of the housing 21 correspondingly define a plurality of latching elements (not labeled), thus the light reflective module 24 and the housing 21 can be assembled together securely.

Figure 5:
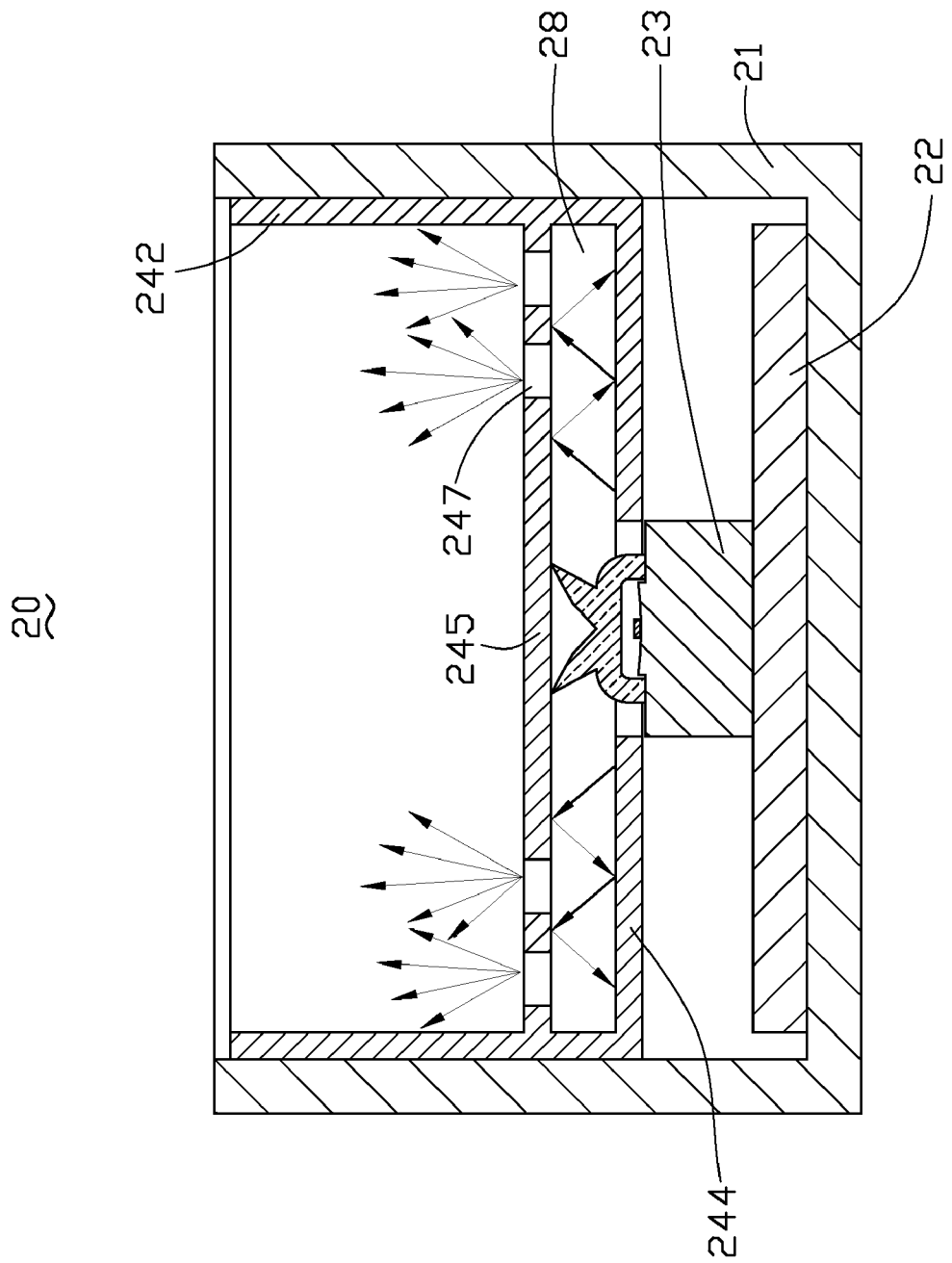
FIG. 5 is a side, enlarged, cross-sectional view of the LED lamp assembly of FIG. 3, taken along line V-V thereof.

Referring to FIG. 5, the light-shielding sheets 245 and the bottom reflective plate 244 cooperatively define a light-mixing space 28. Light from the side light-emitting portions of the LEDs 23 are reflected many times between the light-shielding sheets 245 and the bottom reflective plate 244 of the light mixing space 28 before substantially exiting at an area between the two adjacent light-shielding sheets 245. As a result, a light brightness above the gaps of the LED lamp assembly 20 is increased. In addition, a light brightness above the LEDs 23 of the LED lamp assembly 20 is decreased due to the light reflection of the light-shielding sheets 245. Furthermore, some of the light projects to the lamp cover 26 via the light holes 247 of the light-shielding sheets 245. Since the light holes 247 are formed on the two sides of each of the light-shielding sheets 245 adjacent to the two sidewalls of the housing 21, a light brightness adjacent to the two sidewalls of the LED lamp assembly 20 is increased. Thus, a uniformity of light output from the LED lamp assembly 20 is increased.

It is to be understood that, by selecting the size and shape of the light holes 247, or distribution of the light holes 247, a uniformity of the light brightness above the light-shielding sheets 245 of the LED lamp assembly 20 is adjustable. It should be noted that, not only can the light reflective module 24 be integrally manufactured by punching a metal sheet, it can also be manufactured by assembling a plurality of parts, such as the housing 21, the bottom reflective plate 244, the four sidewalls 242 of the light reflective module 24, and the light-shielding sheet 245.

A method for assembling the light reflective module 24 includes the following steps. Firstly, a metal sheet is punched for manufacturing the bottom reflective plate 244 connecting with four sidewalls 242. Secondly, the bottom reflective plate 244 connecting with four sidewalls 242 is punched to define a plurality of through holes 246 in the bottom reflective plate 244. Thirdly, the bottom reflective plate 244 and the four sidewalls 242 of the light reflective module 24 are mounted into the housing 21. Each of the light-shielding sheets 245 further includes two flanges (not labeled) at the two opposite ends correspondingly. Finally, two flanges of the light-shielding sheets 245 are respectively riveted or welded to correspondingly connect with the two opposite sidewalls 242 of the light reflective module 24.

Figure 6:
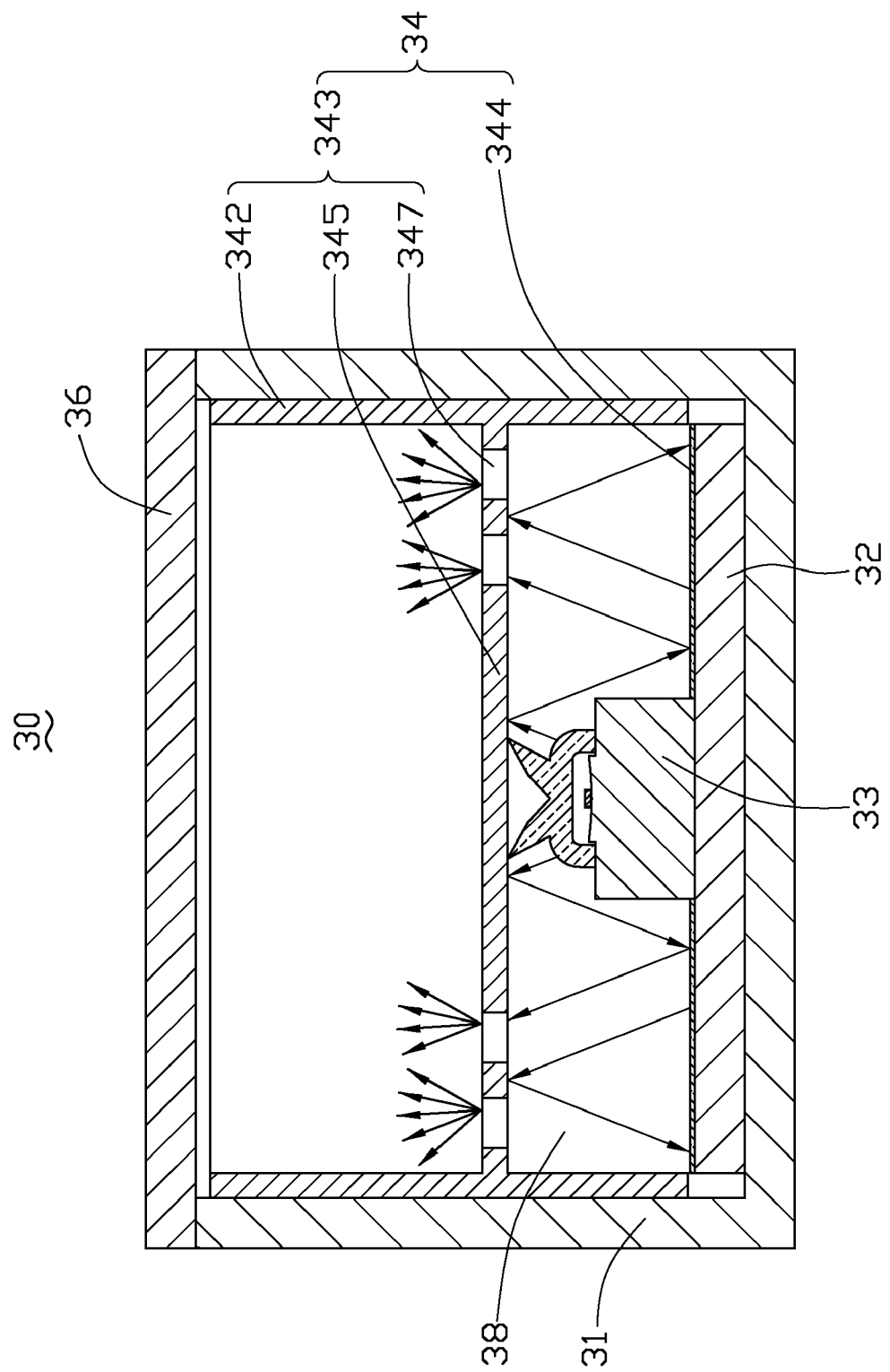
FIG. 6 is a side, cross-sectional view of an LED lamp assembly according to a second preferred embodiment of the present invention.

Referring to FIG. 6, an LED lamp 30 in accordance with a second preferred embodiment of the present invention is shown. The LED lamp 30 includes a housing 31, a printed circuit board 32, a plurality of side-emitting LEDs 33, a light reflective module 34, and a lamp cover 36. The LED lamp 30 is similar in principle to the LED lamp assembly 20 of the first embodiment, except that the light reflective module 34 is different from the light reflective module 24. The light reflective module 34 includes a frame 343, a bottom reflective plate 344 and a plurality of light-shielding sheets 345. The frame 343 and the reflective plate 344 are separate. The bottom reflective plate 344 defines a plurality of through holes (not labeled). The bottom reflective plate 344 is positioned on the printed circuit board 32. The LEDs 33 pass through the through holes 346 correspondingly. The frame 343 includes four connecting sidewalls (not labeled). The frame 343 is correspondingly assembled into the housing 31, each connecting sidewall being in contact with inner surfaces of the sidewalls of the housing 31. The sidewalls of the frame 343 are adjacent to or in contact with the reflective plate 344. The frame 343 and the reflective plate 344 cooperatively define a light-mixing unit 38.

Light rays from the side light-emitting portions of the LEDs 33 are reflected many times between the light-shielding sheets 345 and the bottom reflective plate 344 of the light mixing space 38, and finally many or most of the light rays escape from gaps between the two adjacent light-shielding sheets 345. This results in that a light brightness above the gaps of the LED lamp 30 is increased. In addition, a light brightness above the LEDs 33 of the LED lamp 30 is decreased due to the light reflection of the light-shielding sheets 345. Furthermore, some of the light rays transmit to the lamp cover 36 via the light holes 347 of the light-shielding sheets 345. Because the light holes 347 are distributed at the two sides of each of the light-shielding sheets 345 adjacent to the two sidewalls of the housing 31, a light brightness adjacent to the two sidewalls of the LED lamp 30 is increased. Therefore, a uniformity of light output from the LED lamp 30 is increased.

In an alternative embodiment, in order to obtain a good optical performance such as uniformity of light output from the LED lamps assembly 20, 30, each light-shielding sheet 245, 345 of the LED lamps assembly 20, 30 may have the same distributions as shown in FIGS. 7 through 11.

Figure 7:
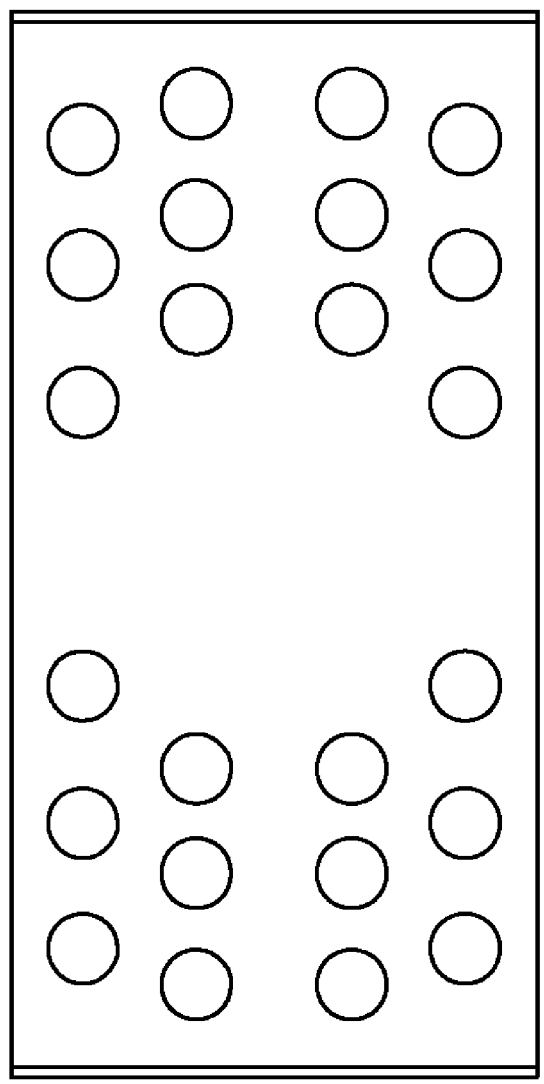
FIGS. 7 through 11 are top plan views of distributions of light holes defined in light-shielding sheets of the LED lamp assembly of the present invention.

Referring to FIG. 7, a distribution of the light holes of a light-shielding sheet is described below. A shape of each of the light holes is circular. A shape and an area of each of the light holes are same. The light-shielding sheet defines a middle point. The light holes are arranged apart along a plurality of imaginary circles that have a same center. The center of the imaginary circle is also a middle point of the light-shielding sheet.

Figure 8:
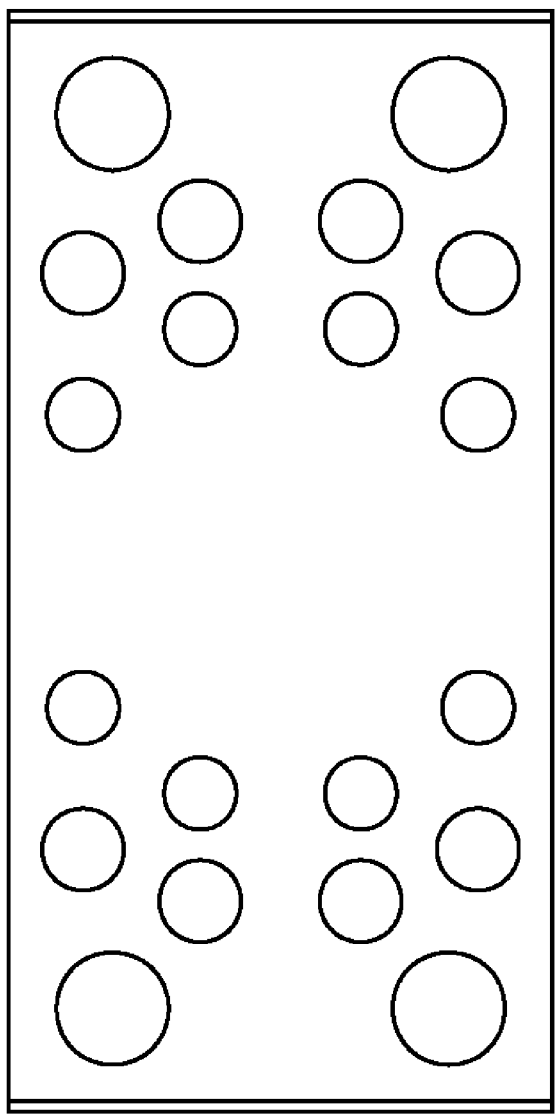

Referring to FIG. 8, a distribution design of the light holes of a light-shielding sheet is described below. A shape of each of the light holes is circular, but have a different radius. The light-shielding sheet defines a middle point. The light holes are arranged apart along a plurality of imaginary circles that have a same center. The center of the imaginary circles is also a middle point of the light-shielding sheet. The radius of the light holes increase along a direction away from the center of the imaginary circles.

Figure 9:
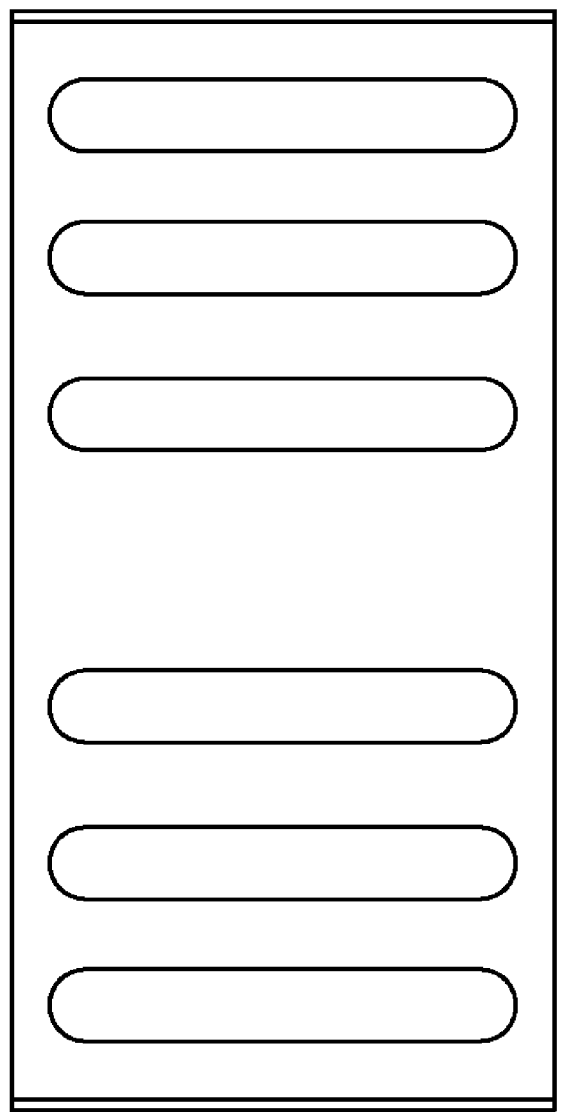

Referring to FIG. 9, a distribution design of the light holes of a light-shielding sheet is described below. A shape of each of the light holes is an elongated opening parallel to the sidewalls of the housing of the LED lamp. At each edge of the light-shielding sheet, the three light holes are equidistant from each other. Length of the three light holes is same.

Figure 10:
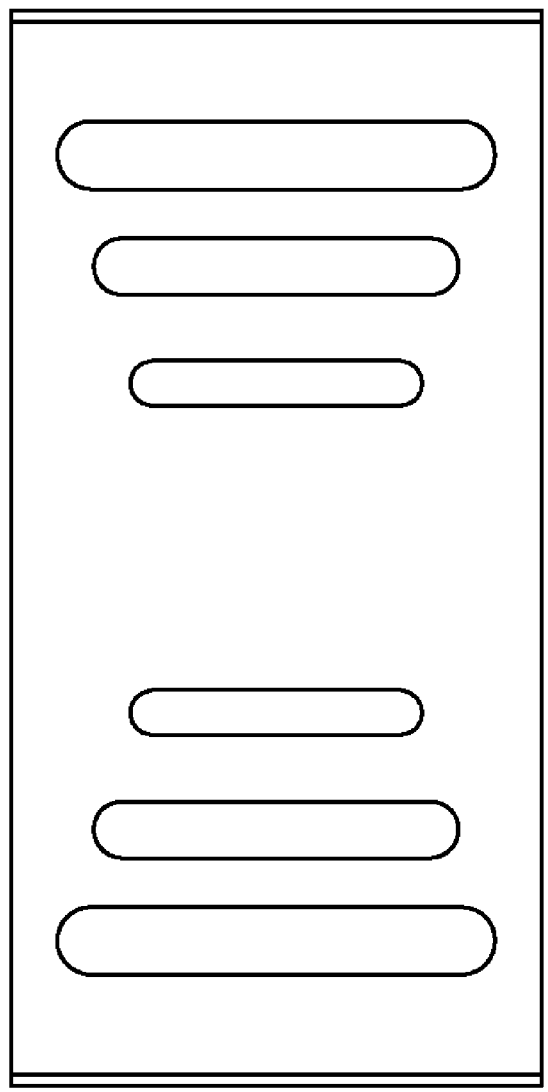

Referring to FIG. 10, a distribution design of the light holes of a light-shielding sheet is described below. A shape of each of the light holes is an elongated opening parallel to the sidewalls of the housing of the LED lamp. At each edge of the light-shielding sheet, the three light holes are equidistant from each other. Lengths of the three light holes are different from each other, lengths of the light holes progressively increases along a direction away from a middle portion of the light-shielding sheet.

Figure 11:
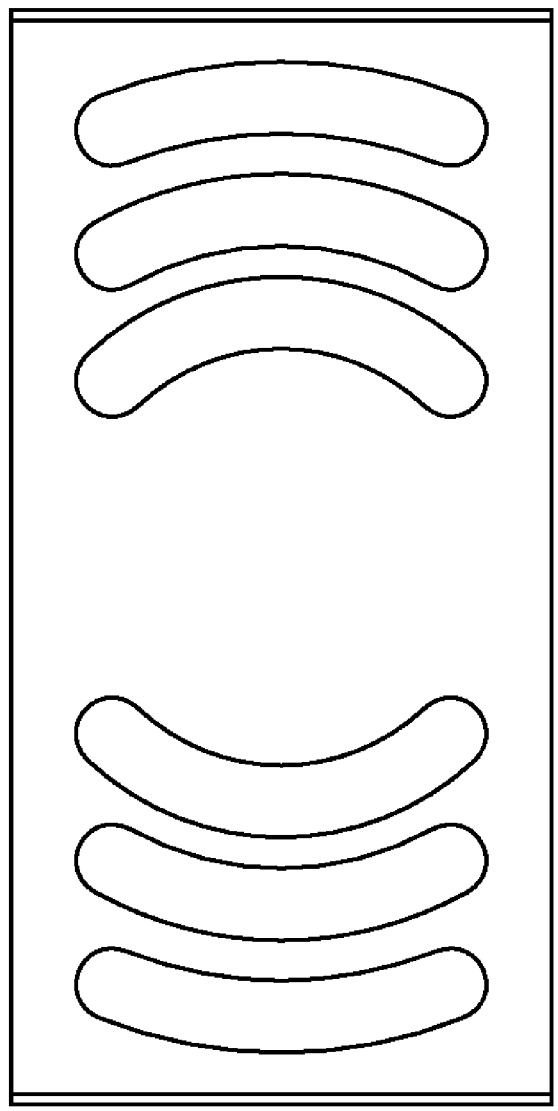

Referring to FIG. 11, a distribution design of the light holes of a light-shielding sheet is described below. A shape of each of the light holes is an annular opening that. The three light holes of one side of the light-shielding sheet are equidistant from each other. The annular light holes have a same center that is a middle portion of the light-shielding sheet.

While various embodiments have been described and illustrated, the invention is not to be construed as being limited thereto. Various modifications can be made to the embodiments by those skilled in the art without departing from the true spirit and scope of the invention as defined by the appended claims.

What is claimed is:

1. An LED lamp assembly comprising:
   a housing having an opening;
   a printed circuit board positioned on a bottom of the housing;
   at least one LED electrically connected with the printed circuit board;
   a light reflective module comprising at least one light-shielding sheet and a bottom reflective plate disposed between the printed circuit board and the light-shielding sheet, the bottom reflective plate defining at least one through hole, the at least one LED passing through the at least one through hole, the at least one light-shielding sheet defining a plurality of light holes and covering the at least one LED, the light-shielding sheet and the bottom reflective plate cooperatively defining a light-mixing space; and
   a lamp cover fixed on the opening of the housing.

2. The LED lamp assembly according to claim 1, wherein the light reflective module further comprises at least two opposite sidewalls extending vertically from a periphery of the bottom reflective plate, each of the light-shielding sheets extending at midsections from the opposing sidewalls.

3. The LED lamp assembly according to claim 2, wherein the bottom reflective plate is supported by base portion of the at least one LED.

4. The LED lamp assembly according to claim 2, wherein the bottom reflective plate is positioned on the printed circuit board.

5. The LED lamp assembly according to claim 2, wherein the light-shielding sheet further comprises two flanges extending from two opposite ends thereof correspondingly, two flanges being respectively riveted or welded to connect with two opposite sidewalls of the light reflective module.

6. The LED lamp assembly according to claim 1, wherein the light reflective module further comprises a frame having four connecting sidewalls, each connecting sidewall being in contact with inner surfaces of the sidewalls of the housing, and the bottom reflective plate is separated from the frame and is positioned on the printed circuit board.

7. The LED lamp assembly according to claim 1, wherein a diameter of each of the through holes of the bottom reflective plate is smaller than a nearest distance between the two edges of the light-shielding sheet.

8. The LED lamp assembly according to claim 1, wherein inner surfaces of the sidewalls of the light reflective module and bottom surface of the bottom reflective plate are both high reflectivity surfaces.

9. The LED lamp assembly according to claim 1, wherein the light reflective module is made of one of metal materials and plastic materials.

10. The LED lamp assembly according to claim 1, wherein the LED is a side-emitting type LED.

11. The LED lamp assembly according to claim 1, wherein the lamp cover is selected from one of transparent plate and light diffusion plate.

12. The LED lamp assembly according to claim 1, wherein a shape and an area of each of the light holes are the same; a shape of each of the light holes is circular; the light holes are defined at two ends of the light-shielding sheet in a matrix manner.

13. The LED lamp assembly according to claim 1, wherein a shape and an area of each of the light holes are the same; a shape of each of the light holes is circular; the light-shielding sheet defines a middle point; the light holes are arranged apart along a plurality of imaginary circles that have a same center; and the center of the imaginary rounds is also the middle point of the light-shielding sheet.

14. The LED lamp assembly according to claim 1, wherein a shape of each of the light holes is circular, but having different radii; the light-shielding sheet defines a middle point thereon; the light holes are arranged apart along a plurality of imaginary circles that have a same center; the center of the imaginary circles is also a middle point of the light-shielding sheet; and the radius of the light holes increase along a direction away from the middle point of the light-shielding sheet.

15. The LED lamp assembly according to claim 1, wherein a shape of each of the light holes is an elongated opening parallel to the sidewalls of the housing; the light holes of one side of the light-shielding sheet are equidistant from each other; and the length of the three light holes is the same.

16. The LED lamp assembly according to claim 1, wherein a shape of each of the light holes is an elongated opening parallel to the sidewalls of the housing; the light holes of one side of the light-shielding sheet are equidistant from each other; lengths of the three light holes are different from each other; and lengths of the light holes, at each edge of the light-shielding sheet, progressively increasing along a direction away from the middle portion of the light-shielding sheet.

17. The LED lamp assembly according to claim 1, wherein a shape of each of the light holes is an annular opening; the light holes of one side of the light-shielding sheet are equidistant from each other; and the annular light holes have a same center that is a middle portion of the light-shielding sheet.

* * * * *